United States Patent [19]
Muraki

[11] Patent Number: 5,996,557
[45] Date of Patent: Dec. 7, 1999

[54] FUEL INJECTION TIMING CONTROL SYSTEM OF FUEL-INJECTION PUMP FOR DIESEL ENGINES

[75] Inventor: Hirotada Muraki, Yokohama, Japan

[73] Assignee: Nissan Motor Co., Ltd., Yokohama, Japan

[21] Appl. No.: 09/016,339

[22] Filed: Jan. 30, 1998

[30] Foreign Application Priority Data

Jan. 31, 1997 [JP] Japan .................................. 9-018065

[51] Int. Cl.⁶ .................................................. F02M 37/04
[52] U.S. Cl. .......................................... 123/502; 123/458
[58] Field of Search ............................. 123/502, 179.17, 123/458, 501, 500, 494

[56] References Cited

U.S. PATENT DOCUMENTS

| | | | |
|---|---|---|---|
| 4,355,621 | 10/1982 | Yasuhara | 123/502 |
| 4,493,302 | 1/1985 | Kawamura | 123/357 |
| 4,590,913 | 5/1986 | Faupel | 123/502 |
| 4,592,327 | 6/1986 | Fujimori | 123/502 |
| 4,825,373 | 4/1989 | Nakamura et al. | 364/431.05 |
| 5,188,084 | 2/1993 | Sekiguchi | 123/502 |
| 5,201,297 | 4/1993 | Eblen | 123/502 |
| 5,375,575 | 12/1994 | Ohishi | 123/502 |
| 5,531,204 | 7/1996 | Sekiguchi | 123/502 |
| 5,617,831 | 4/1997 | Shirakawa | 123/502 |
| 5,697,347 | 12/1997 | Enomoto | 123/502 |
| 5,806,498 | 9/1998 | Iwai | 123/502 |

FOREIGN PATENT DOCUMENTS 0657638  6/1995  European Pat. Off. .
7-127552  5/1995  Japan .

*Primary Examiner*—Carl S. Miller
*Attorney, Agent, or Firm*—Foley & Lardner

[57] ABSTRACT

A fuel injection timing control system for a diesel fuel injection pump with a duty-cycle controlled electromagnetic solenoid valve associated with an injection-timing-control timer piston to change a timer-piston axial position or a set position of a pump plunger in response to a duty cycle of the electromagnetic solenoid valve, comprises a control unit for transiently permitting the entry of a duty cycle of the electromagnetic solenoid valve into a predetermined dead-zone for a predetermined period of time during a fuel injection timing closed-loop control in which an actual injection timing is feed-back controlled toward a target injection timing. In addition, the control unit limits the duty cycle of the electromagnetic solenoid valve to a predetermined limiting value as soon as the predetermined time period has been elapsed, during the fuel injection timing closed-loop control.

14 Claims, 8 Drawing Sheets

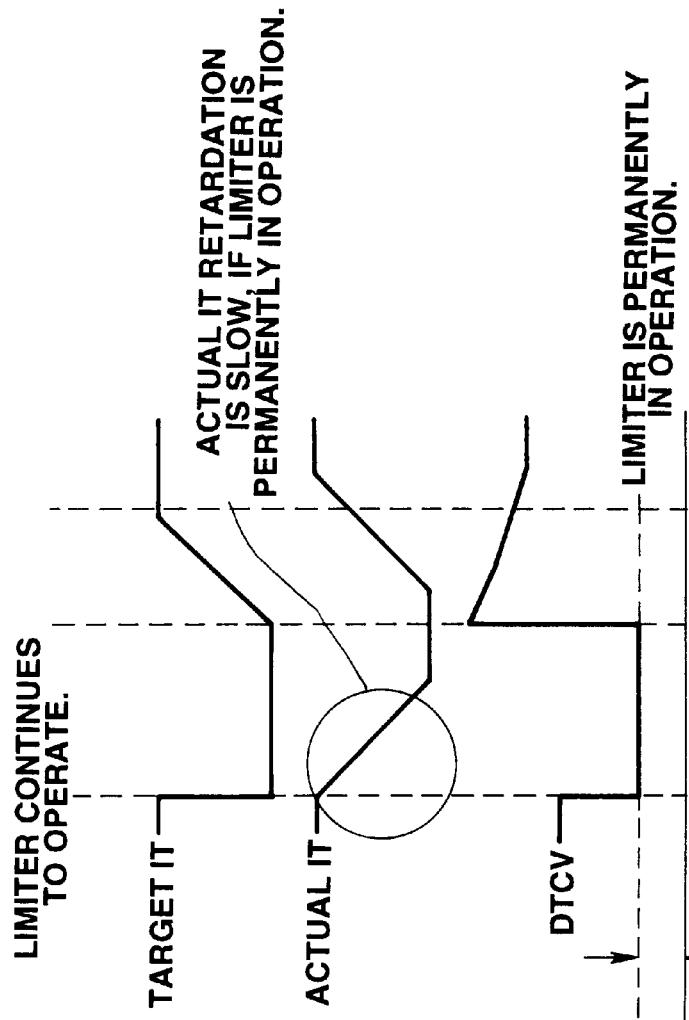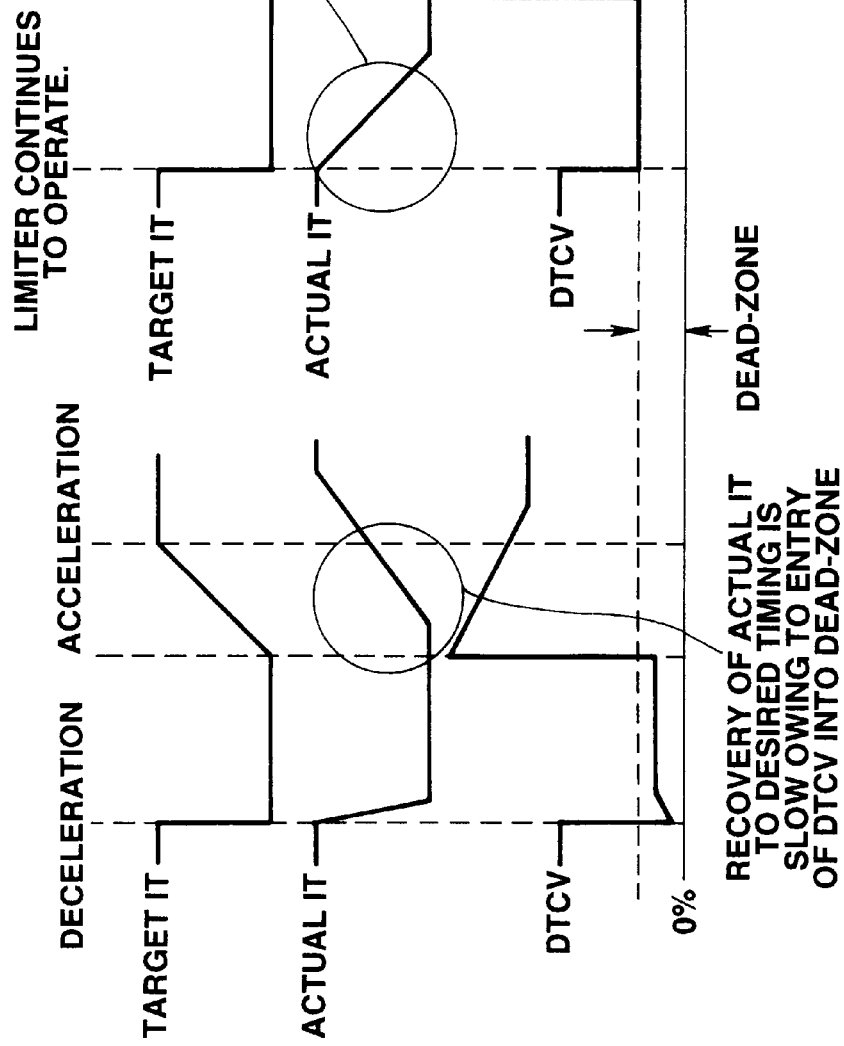

FUEL INJECTION TIMING CONTROL SYSTEM OF FUEL-INJECTION PUMP FOR DIESEL ENGINES

The contents of Application No. TOKUGANHEI 9-18065, filed Jan. 31, 1997, in Japan is hereby incorporated by reference.

BACKGROUND OF THE INVENTION

1. Field of the Invention

The present invention relates to a fuel injection timing control system of a fuel-injection pump for diesel engines.

2. Description of the Prior Art

On conventional distributor type fuel-injection pumps for use in diesel engines, the injection pump employs therein a fuel-injection timing control piston, often called a "timer piston" serving as a fuel-injection timing control member, so that a fuel-injection timing is controllable depending on an axial sliding movement or an axial position of the timer piston. One end of the timer piston cooperates with the cylindrical piston chamber of the pump housing to define a high-pressure chamber which communicates with the pump discharge outlet port (i.e., a pump chamber of a fuel-feed pump) via an orifice (exactly a flow-restriction orifice), whereas the other end of the timer piston cooperates with the cylindrical piston chamber of the pump housing to define a low-pressure chamber which communicates with the pump inlet port (i.e., a suction chamber of the fuel-feed pump). A communication passageway is provided between the high-pressure and low-pressure chambers for intercommunication therebetween. An electro-magnetic valve (exactly an electromagnetic solenoid valve) is also provided in the communication passageway for opening and closing the communication passageway at a desired duty cycle. That is to say, the opening and closing of the electromagnetic solenoid valve is controlled or regulated by way of a so-called duty-cycle control (exactly a duty-cycle modulated control) of the electromagnetic solenoid valve or an on and off time control of the solenoid valve, thereby controlling or regulating the amount of fuel flowing from the high-pressure chamber to the low-pressure chamber depending on the desired duty cycle value. Thus, a pressure in the high-pressure chamber is adjustable (in other words, the pressure differential between the high-pressure and low-pressure chambers of the fuel-feed pump) depending on the duty cycle of the solenoid valve. Therefore, the axial position of the timer piston is controlled by balancing the controlled pressure differential between the high-pressure and low-pressure chambers to the spring bias of a return spring which is operably disposed in the previously-noted cylindrical piston chamber to act on the one end of the timer piston. In the conventional diesel-engine fuel-injection system, the timer piston is mechanically linked to a pump plunger to adjust the axial position of the pump plunger according to the axial position of the timer piston and consequently to adjust the fuel injection timing. Also, the conventional electronic fuel-injection system sets a target fuel-injection timing usually based on engine/vehicle operating conditions such as engine load and speed. For instance, Japanese Patent Provisional Publication No. 7-127552 has been disclosed a fuel-injection timing detecting device for diesel engines. The Japanese Patent Provisional Publication No. 7-127552 teaches detection of an actual fuel-injection timing by means of an injector nozzle-needle lift sensor (simply a nozzle lift sensor), and setting or determining a duty cycle (or a duty ratio) of the previously-noted electromagnetic solenoid valve associated with the timer piston by comparing the calculated target fuel-injection timing with the actual fuel-injection timing detected by the nozzle lift sensor, and thus feed-back controlling the fuel-injection timing by a determined duty-cycle signal (exactly a pulse-width modulated voltage signal at the controlled duty cycle determined based on the result of comparison between the calculated fuel-injection timing and the actual fuel-injection timing). Generally, during the duty-cycle control, there are two different dead-bands, one being a lower dead-zone less than the lowest possible duty cycle value and the other being an upper dead-zone greater than the highest possible duty cycle value. That is, there is no change in the timer piston within the upper and lower dead-zones. On the contrary, within a usual duty-cycle zone defined between the upper and lower dead-zones, the axial position of the timer piston can be controlled or adjusted depending on the controlled duty cycle. The previously-discussed usual duty-cycle zone will be hereinafter referred to as an "effective duty-cycle zone". Assuming that increment in the duty cycle of the electromagnetic solenoid valve corresponds to an advance of the fuel-injection timing and that decrement in the duty cycle corresponds to a retardation of he fuel-injection timing, the duty cycle value (abbreviated to "DTCV") of the solenoid valve associated with the timer piston is greatly reduced when the target fuel-injection timing (abbreviated to "target IT") is greatly retarded owing to deceleration of the vehicle, as seen in FIG. 8A. Such great and rapid reduction in the duty cycle results in easy entry of the duty cycle value (DTCV) into the previously-noted lower dead-zone. Thereafter, even when the vehicle is accelerated soon, there is a tendency for the recovery from the lower dead-zone to the effective duty-cycle zone to retard due to a rapid drop in the duty cycle value, thereby resulting in undesiredly slow advance of the actual fuel-injection timing (abbreviated to "actual IT"). As may be appreciated, the use of a limiting circuit (or a limiter) is effective to avoid entry into the upper dead-zone as well as the lower dead-zone, for limiting the duty cycle value within two predetermined upper and lower duty-cycle limits, so that the controlled duty cycle value is variable between the predetermined upper limit and the predetermined lower limit. The use of the limiter may effectively prevent entry into the lower dead-zone even when rapidly decelerated, thus enhancing a follow-up performance of the fuel-injection timing advance in a transition from during deceleration to during acceleration. However, when the controlled duty value is limited actually to the predetermined lower limit by means of the limiter (the duty-cycle value limiting process) as seen in FIG. 8B, there is a tendency for the actual IT to be gradually slowly adjusted to a proper timing suitable for the current engine/vehicle operating condition, because of a comparatively moderate drop in the controlled duty cycle value as compared with the rapid duty-cycle drop shown in FIG. 8A. The undesiredly slower fuel-injection timing retardation may lower the responsiveness of the fuel-injection timing control based on the controlled duty cycle.

SUMMARY OF THE INVENTION

Accordingly, it is an object of the invention to provide a fuel injection timing control system of a duty-cycle controlled fuel-injection pump for diesel engines which avoids the aforementioned disadvantages of the prior art.

It is another object of the invention to provide a fuel injection timing control system of a duty-cycle controlled fuel-injection pump for diesel engines, which is capable of permitting or inhibiting entry of a controlled duty cycle value into an upper dead-zone greater than the highest possible duty cycle and a lower dead-zone less than the lowest possible duty cycle, particularly the lower dead-zone.

In order to accomplish the aforementioned and other objects of the present invention, a fuel injection timing control system for a diesel fuel injection pump comprises a timer piston mechanically linked to a pump plunger for changing a set position of the pump plunger through an axial movement of the timer piston, a duty-cycle controlled electromagnetic solenoid valve associated with the timer piston for causing a change in the set position of the pump plunger by varying an axial position of the timer piston in response to a duty cycle of the electromagnetic solenoid valve, and for regulating an injection timing of fuel supplied from the diesel fuel injection pump to a diesel fuel injector with the change in the set position of the pump plunger, and a control unit for transiently permitting entry of the duty cycle of the electromagnetic solenoid valve into a predetermined dead-zone for a predetermined period of time so that an actual fuel injection timing is adjusted toward a target fuel injection timing based on an engine operating condition, and for limiting the duty cycle to a predetermined limiting value when the predetermined time period has been elapsed, during a fuel injection timing closed-loop control.

According to another aspect of the invention, a fuel injection timing control system for a diesel fuel injection pump with an electromagnetic solenoid valve in which an injection timing of fuel supplied from the diesel fuel injection pump to a diesel fuel injector is controllable by a duty cycle of the electromagnetic solenoid valve, comprises a target injection timing setting circuit for setting a target injection timing based on an engine operating condition, an actual injection timing detection circuit for detecting an actual injection timing, a duty-cycle setting circuit for setting a duty cycle of the electromagnetic solenoid valve by comparing the target injection timing with the actual injection timing, an entry-into-dead-zone detection circuit for detecting entry of the duty cycle into a predetermined dead-zone, a duty-cycle limiting permission circuit for generating an enable signal of duty-cycle limitation processing with a predetermined delay time from detection of the entry of the duty cycle into the predetermined dead-zone, and a duty-cycle limitation processing circuit being responsive to the enable signal from the duty-cycle limiting permission circuit for limiting the duty cycle to a predetermined duty cycle limiting value so that the duty cycle comes out of the predetermined dead-zone. With the previously-noted arrangement, when the entry of the duty cycle of the electromagnetic solenoid valve into the predetermined dead-zone is detected, the duty-cycle limitation processing initiates with the predetermined delay time from detection of the entry of the duty cycle into the predetermined dead-zone. Thus, the duty-cycle limitation processing is transiently inhibited for a predetermined time period from the beginning of deceleration of the vehicle so that the system permits a retard action of the injection timing to happen so quickly, and then permitted so that the duty cycle is limited to a predetermined limiting value at the end of the deceleration period and so that the system permits an advance action of the injection timing to happen so smoothly in a transition from deceleration to acceleration. This enhances a response of the fuel-injection timing feedback control (the closed-loop injection timing control), irrespective of deceleration or acceleration.

The duty-cycle limiting permission circuit may include a timer which begins to count an elapsed time from a time when the entry of the duty cycle into the predetermined dead-zone is detected, and the duty-cycle limiting permission circuit outputs the enable signal of duty-cycle limitation processing when a count value of the timer reaches a predetermined period of time. Therefore, the timing of outputting of the enable signal of the duty-cycle limitation processing is precisely timed by the timer.

It is preferable that the duty-cycle limiting permission circuit outputs the enable signal when the target injection timing becomes generally equal to the target injection timing after detection of the entry of the duty cycle into the predetermined dead-zone. The timing of beginning of the duty-cycle limitation processing is more properly timed, while watching the actual effect of the fuel injection timing feedback control (that is, the degree of convergence of the actual injection timing to the target injection timing).

Alternatively, the duty-cycle limiting permission circuit may include a timer which begins to count an elapsed time from a time when the target injection timing becomes generally equal to the target injection timing after detection of the entry of the duty cycle into the predetermined dead-zone, and the duty-cycle limiting permission circuit outputs the enable signal of duty-cycle limitation processing when a count value of the timer reaches a predetermined period of time. In this case, the duty-cycle limitation processing is inhibited until the result of response of the injection timing feedback control is stabilized and thus adequate convergence of the actual injection timing to the target injection timing is attained through the feedback control. This ensures a more precise timing of beginning of the duty-cycle limitation processing.

Preferably, the duty-cycle limitation processing circuit may determine a limiting value so that the limiting value reaches the predetermined duty cycle limiting value at a predetermined time rate of change, so as to enable a smooth adjustment of the duty cycle to the predetermined duty cycle limiting value.

It is preferable that the entry-into-dead-zone detection circuit, the duty-cycle limiting permission circuit and the duty-cycle limitation processing circuit are brought into operation at least under an operating condition of engine idle. This fulfills a response of the injection timing feedback control, greatly matching the operating condition of engine idle.

According to a further aspect of the invention, a fuel injection timing control system for a diesel fuel injection pump, comprises a pressure-differential operated timer piston, each piston end cooperating with a pump casing to define a high-pressure chamber and a low-pressure chamber, the timer piston mechanically linked to a pump plunger for changing a set position of the pump plunger through an axial movement of the timer piston based on a pressure differential between the high-pressure and low-pressure chambers, a duty-cycle controlled electromagnetic solenoid valve fluidly disposed in a communication passage intercommunicating the high-pressure and low-pressure chambers for causing a change in the set position of the pump plunger by varying the pressure differential in response to a duty cycle of the electromagnetic solenoid valve, and for regulating an injection timing of fuel supplied from the diesel fuel injection pump to a diesel fuel injector with the change in the set position of the pump plunger, a target injection timing setting circuit for setting a target injection timing based on an engine operating condition, an actual injection timing detection circuit for detecting an actual injection timing, a duty-cycle setting circuit for setting a duty cycle of the electromagnetic solenoid valve by comparing the target injection timing with the actual injection timing, an entry-into-dead-zone detection circuit for detecting entry of the duty cycle into a predetermined lower dead-zone, a duty-cycle limiting permission circuit for generating an enable signal of duty-cycle limitation processing with a predetermined delay time from detection of the entry of the duty cycle into the predetermined lower dead-zone, and a duty-cycle limitation processing circuit being responsive to the enable signal from the duty-cycle limiting permission circuit for limiting the duty cycle to a predetermined duty cycle lower limiting value so that the duty cycle comes out of the predetermined lower dead-zone. Preferably, the duty-cycle limiting permission circuit may include a timer which begins to count an elapsed time from a time when the entry of the duty cycle into the predetermined lower dead-zone is detected, and the duty-cycle limiting permission circuit outputs the enable signal of duty-cycle limitation processing when a count value of the timer reaches a predetermined period of time. Preferably, the duty-cycle limiting permission circuit may output the enable signal when the target injection timing becomes generally equal to the target injection timing after detection of the entry of the duty cycle into the predetermined lower dead-zone. Alternatively, the duty-cycle limiting permission circuit may include a timer which begins to count an elapsed time from a time when the target injection timing becomes generally equal to the target injection timing after detection of the entry of the duty cycle into the predetermined lower dead-zone, and the duty-cycle limiting permission circuit outputs the enable signal of duty-cycle limitation processing when a count value of the timer reaches a predetermined period of time. More preferably, the duty-cycle limitation processing circuit may determine a limiting value so that the limiting value increases up to the predetermined duty cycle lower limiting value at a predetermined time rate of change. It is preferable that the entry-into-dead-zone detection circuit, the duty-cycle limiting permission circuit and the duty-cycle limitation processing circuit are brought into operation at least under an operating condition of engine idle. Alternatively, the entry-into-dead-zone detection circuit, the duty-cycle limiting permission circuit and the duty-cycle limitation processing circuit may be brought into operation when the fuel injection timing control system is in a closed-loop mode during engine idling.

BRIEF DESCRIPTION OF THE DRAWINGS

FIGS. 8A and 8B are fuel injection timing control characteristics which are obtained by the prior art systems.

DESCRIPTION OF THE PREFERRED EMBODIMENTS

Figure 2:
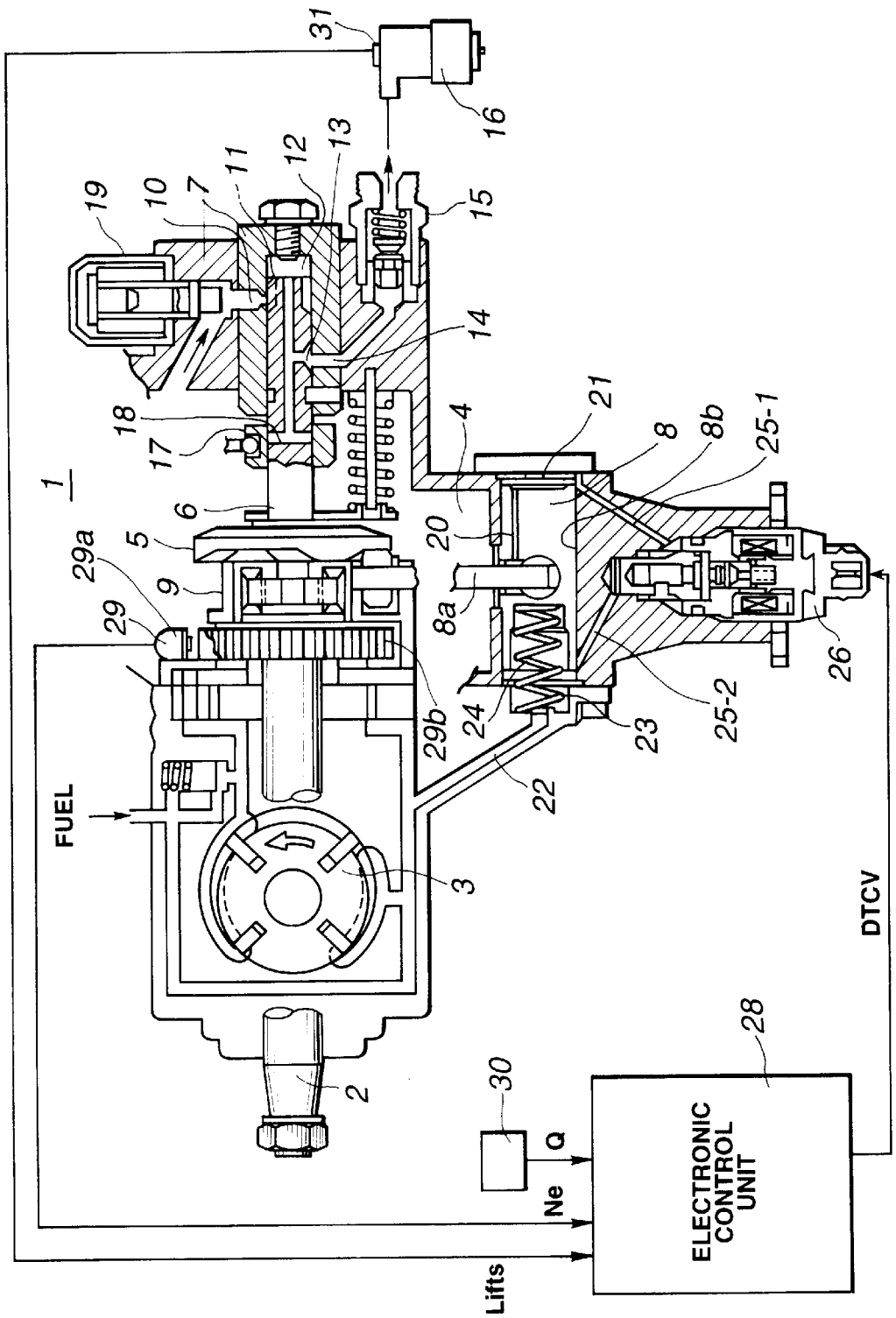
FIG. 2 is a cross sectional view illustrating an example of a duty-cycle controlled fuel-injection pump employed in the fuel injection timing control system shown in FIG. 1.

Referring now to the drawings, particularly to FIG. 2, the fuel injection timing control system of the invention is exemplified in case of a distribution type fuel injection pump for a fuel-injected diesel engine. A diesel fuel injection pump unit denoted by reference sign 1 has a drive shaft 2 (or a pump shaft) and a fuel feed pump 3. As seen in FIG. 2, as an example of the fuel feed pump 3, a typical vane pump is shown. In the shown embodiment, although the feed pump 3 comprises a vane pump, the feed pump may be replaced with another type of pumps for example a plunger pump. The fuel feed pump 3 is driven by the drive shaft 2 which has a driven connection with the fuel-injected diesel engine. Fuel is fed from a fuel tank (not shown) via the pump 3 into a pump chamber 4 defined in the pump case. As seen in the upper half of FIG. 2, a pump plunger 6 is coaxially connected to the right-hand end of the drive shaft 2 usually by way of spline connection, so that the plunger 6 is rotated together with the drive shaft 2, while permitting an axial sliding motion of the plunger 6 with respect to the drive shaft 2. A cam disc 5 is concentrically fixed near at the left end of the plunger 6. A cam mechanism, consisting of the cam disc 5 and a substantially cylindrical roller holder 9 serving as a cam follower communicated to the cam disc 5, is provided at the connecting portion (the spline-connection portion) between the right-hand drive shaft end and the left-hand pump plunger end, so as to produce an axial reciprocating motion (rightward and leftward motion in the cylinder 7) of the pump plunger 6. The axial reciprocating motion of the plunger 6 provides a high-pressure pumping action, as will be fully described later. The roller holder 9 is provided in such a manner as to surround the outer periphery of the connecting portion between the right end of the drive shaft 2 and the left end of the pump plunger 6. Note that the inner periphery of the substantially cylindrical roller holder 9 is out of contact with or in sliding contact with the outer periphery of the previously-noted connecting portion, in a manner so as to permit the rotary motion of the drive shaft 2 without any rotary motion of the roller holder 9 itself. A plurality of circumferentially equi-distant spaced rollers are rotatably held in the roller holder 9. On the other hand, the cam disc 5 is formed on its left-hand side wall integral with a circumferentially undulated, contoured cam surface. As seen in FIG. 2, the circumferentially undulated, contoured cam surface consists of a plurality of cam lobes (ridges) and a plurality of cam grooves (troughs) alternating with each other. The left-hand contoured cam surface of the cam disc 5 mates with the respective rollers rotatably employed in the roller holder 9, in a manner so as to provide a cam connection between the rollers of the roller holder 9 and the contoured cam surface of the cam disc 5. Each of the cam lobe sections of the cam disc 5 is associated with the engine cylinder of a certain cylinder number, so that there is a one-to-one correspondence between the cam lobe sections and the engine cylinders. The cam disc 5 is biased in the axially leftward direction (viewing FIG. 2) by way of a return spring (not numbered) such as a coiled compression spring, so as to permanently keep the cam connection, irrespective of engine load and speed. Thus, the rotary motion of the cam disc 5 is changed to the reciprocating motion of the pump plunger 6 by means of the cam mechanism (that is, the cam disc 5 and the roller holder 9). The roller holder 9 is mechanically linked via a linkage 8a to a timer piston 8 serving as a fuel-injection timing control piston. As may be appreciated from FIG. 2, an axial position of the roller holder 9 (that is, an axial position of the cam disc 5) is determined depending on an axial position of the timer piston 8. More precisely, when the timer piston 8 moves axially leftwards (towards a low-pressure chamber 23) from the axial position shown in FIG. 2, the rod-like linkage 8a also moves leftwards, since one end(the lower end) of the linkage 8a is securely connected essentially to the center of the timer piston 8 and the other end (the upper end) of the linkage 8a is connected to the roller holder 9. Conversely, when the timer piston 8 moves axially rightwards (towards a high-pressure chamber 21) from the axial position shown in FIG. 2, the linkage 8a also moves rightwards, with the result that the cam mechanism (the roller holder 9 and the cam disc 5) is slightly displaced or relocated in the axial rightward direction. With the previously-noted arrangement, each time one of the cam lobes of the cam disc 5 passes through a certain roller of the roller holder 9, the pump plunger 6 axially moves once. That is, when the pump plunger 6 is rotated together with the drive shaft 2, the plunger 6 axially reciprocates as many times as the number of the cam lobes for every one revolution of the plunger 6.

During the suction stroke with the axial leftward movement of the plunger 6, fuel in the pump chamber 4 is fed through an inlet port 10 of the cylinder 7, and a fuel suction groove 11 formed at the right end of the plunger 6 into a pumping chamber 12 facing the rightmost end face of the plunger 6. On the contrary, during the discharge stroke (or during the pressurization stroke) with the axial rightward movement of the plunger 6, the fuel in the pumping chamber 12 is pressurized and at the same time the pressurized fuel is fed through an axial bore (not numbered) axially defined in the plunger 6 and intercommunicating the pumping chamber 12, and a cut-off port 18 which will be hereinafter detailed, via a distribution groove 13 formed in the plunger 6 to one of a plurality of discharge ports 14 defined in the cylinder 7. Then, the pressurized fuel is delivered through a discharge outlet valve 15 such as a one-way check valve via a high-pressure conduit (not numbered) to a fuel-injection nozzle 16 (a fuel injector) under high pressure. Note that for the sake of illustrative simplicity, only one of the plurality of fuel injectors 16 is shown. Actually, an individual fuel injector 16 is used for each engine cylinder. The fuel injector 16 is a typical diesel fuel injector with a pintle nozzle in which a spring-loaded injector needle valve or pintle controls a hollow cone shaped fuel spray. As previously discussed, the axial position of the roller holder 9 relative to the drive shaft 2 is changeable by adjusting the axial position of the timer piston 8. The change in the axial position of the roller holder 9 results in a slight relative axial displacement between the drive shaft 2 and the pump plunger 6. The slight axial displacement of the plunger 6 to the drive shaft 2, causes a change in the timing of matching between the distribution groove 13 of the plunger 6 and the respective discharge port 14 of the cylinder 7. In other words, the change in the axial position of the roller holder 9 induces a change in the fuel injection timing (exactly a change in the timing of initiation of fuel injection). As set out above, the fuel injection timing (the timing of initiation of fuel injection) can be controlled by properly adjusting the axial position of the timer piston 8. A control sleeve 17 is also provided near the innermost end of the cylinder 7 so that the control sleeve 17 is slidably fitted onto a portion of the plunger 6 projecting out of the innermost end of the cylinder 7, and so that the fuel in the pumping chamber 12 is leaked through the cut-off port 18 and returned again to the pump chamber 4 when the cut-off port 18 moves out of the inner peripheral surface of the control sleeve 17 and thus exposes to the pump chamber 4. Such fuel leakage causes the pressure of fuel in the pumping chamber 12 to rapidly drop, and as a result the fuel pressure in the distribution groove 13 (or the discharge port 14) is rapidly dropped and becomes less than a set pressure of the discharge outlet valve 15. As a consequence, the discharge outlet valve 15 (the one-way check valve) is closed. With the valve 15 closed, the fuel pressure in the fuel injector 16 is drops and the injector needle valve return spring (not shown) forces the injector needle valve to remain closed and prevents any fuel leakage from the injector nozzle. In this manner, a series of fuel injecting operation terminates. Usually, the position of the control sleeve 17 is adjusted by means of an electronic governor (not shown). The timing of termination of fuel injection (in other words, the amount of fuel injection) is controllable by adjusting the position of the control sleeve 17 through the electronic governor as previously described. Also provided is a fuel-cut valve unit 19, for stopping the fuel supply to the pumping chamber 12 by shutting off the suction port 10 by a poppet-like valve of the fuel-cut valve unit 19.

Details of the adjustment of the axial position of the timer piston 8 will be hereinbelow described.

As seen in FIG. 2, the pump casing of the pump unit 1 defines therein a timer-piston chamber 8b which slidably encloses the timer piston 8. The left-hand portion of the timer-piston chamber 8b cooperates with the left-hand end face of the timer piston 8 to define the low-pressure chamber 23, whereas the right-hand portion of the timer-piston chamber 8b cooperates with the right-hand end face of the timer piston 8 to define the high-pressure chamber 21. The high-pressure chamber 21 communicates with the pump chamber 4 (the discharge side of the feed pump 3) through a fuel passageway 20 whose opening size is comparatively small to provide a proper orifice constriction. The left end of the timer piston 8 faces the low-pressure chamber 23 which communicates with the suction side of the feed pump 3 through a fuel passageway 22. A return spring 24 such as a coiled compression spring is operably disposed in the low-pressure chamber 21 to permanently bias the timer piston 8 in a direction of the high-pressure chamber 21, that is, in the axial rightward direction (viewing FIG. 2). In FIG. 2, reference signs 25-1 and 25-2 denote first and second fluid communication passages, respectively. One end of the first communication passage 25-1 communicates with the high-pressure chamber 21, whereas one end of the second communication passage 25-2 communicates with the low-pressure chamber 23. An electromagnetic valve 26 (exactly an electromagnetic solenoid valve) is fluidly disposed between the first and second communication passages 25-1 and 25-2, so that the fluid communication between the other end of the first communication passage 25-1 and the other end of the second communication passage 25-2 is controlled by means of the electromagnetic valve 26. The opening and closing of the electromagnetic solenoid valve 26 is controlled or regulated in response to a duty-cycle signal (or a pulse-width time signal or a pulse-width modulated voltage signal often called as "PWM signal") which is generated from a control unit 28 generally comprising a microcomputer. Concretely, with a decreased duty cycle (or the decreased solenoid ON time or the decreased solenoid valve opening time) of the electromagnetic solenoid valve 26, the amount of fuel leakage from the high-pressure chamber 21 to the low-pressure chamber 23 is reduced and as a result the fuel pressure in the high-pressure chamber 21 rises up to a relatively high pressure level with respect to the low-pressure chamber 23. The relative pressure rise of the high-pressure chamber 21 forces the timer piston 8 in a direction of the low-pressure chamber (in the leftward direction) against the bias of the spring 24. As previously described, the axial leftward movement of the timer piston 8 causes the axial leftward movement of the cam mechanism (the two members 5 and 9), and as a result the fuel injection timing is retarded. Conversely, when the duty cycle of the solenoid valve 26 is increased, the fuel leakage from the high-pressure chamber 21 to the low-pressure chamber 23 is increased. Thus, the fuel pressure in the high-pressure chamber 21 drops down to a relatively low pressure level substantially equal to the fluid pressure in the low-pressure chamber 23. Owing to the pressure drop of the high-pressure chamber 21, the timer piston 8 is moved towards the high-pressure chamber 21 (rightwards) by way of the bias of the spring 24. The axial rightward movement of the timer piston 8 causes the axial rightward movement of the cam mechanism (the two members 5 and 9), and as a result the fuel injection timing is advanced. As input informational signal data necessary for the fuel-injection timing control, the input interface of the control unit 28 receives signals from various vehicle sensors, namely a rotational speed sensor 29, an accelerator sensor 30, and a needle valve lift sensor 31. In the shown embodiment, an electromagnetic pulse pickup type speed sensor is used as the rotational speed sensor 29. As seen in FIG. 2, the pulse pickup type speed sensor 29 consists of a ring-gear like toothed signal disc plate 29b (a rotor disc) which is fixed to the drive shaft 2 of the fuel-injection pump unit 1 for co-rotation with the drive shaft 2, and a pickup coil 29a (a stator) which is mounted on the pump casing and wound usually on an iron core. As the toothed signal disc plate rotates with the drive shaft 2, the teeth of the disc plate 29b will approach a point where they are in direct alignment with the center of the pickup coil 29a which is an electromagnet. When this occurs, a small air gap exists between the pickup coil 29a and the toothed signal disc plate 29b. Electric power is continuously flowing through the pick-up coil 29a to produce a magnetic flux field in both the pickup coil and the core. As each tooth of the rotating disc plate 29b approaches the pickup coil 29a, the reluctance of the magnetic circuit will rapidly decrease, with the increased magnetic field strength. The increased magnetic field strength induces a voltage in the pickup coil. As the tooth moves away from the pickup coil core, the reluctance of the magnetic circuit will rapidly increases, but the magnetic field strength will decrease. As a result of this, the changing magnetic field strength induces a pulse voltage (a positive voltage followed by a negative voltage) in the pickup coil winding. The pulse voltage signal generated from the pulse pickup type speed sensor 29 is sent out to the input interface circuit of the electronic control unit 28. The control unit 28 detects a crankshaft angular position (or a crank angle) from the voltage pulse signal, and also detects an engine speed Ne (corresponding to a speed of the fuel injection pump) from a frequency of the pulse signal or the number of pulses for a predetermined period of time. The accelerator sensor 30 is provided for detecting the opening of the accelerator (regarded as the throttle opening) as a value equivalent to the engine load Q. The needle valve lift sensor 31 is provided for detecting an actual lift Lifts of the needle valve or the fuel metering pintle valve of the fuel injector 16, thus detecting an actual fuel-injection timing of the injector. The control unit 28 arithmetically calculates a basic duty cycle value (DTCVP) on the basis of the engine speed indicative signal Ne from the rotational speed sensor 29, the engine load indicative signal Q from the accelerator sensor 30, and the actual fuel-injection timing indicative signal from the needle valve lift sensor 31. The arithmetic calculation for the basic duty cycle value (DTCVP) is usually executed by a central processing unit (CPU) employed in the microcomputer of the control unit 28. The arithmetic calculation routine herebelow described in detail by reference to the flow chart shown in FIG. 3.

In step S1, first, the engine speed indicative signal Ne (corresponding to the fuel-injection pump speed) and the engine load indicative signal Q (corresponding to the accelerator opening) are read, and second, a target fuel-injection timing (simply a target IT) is set or retrieved from a predetermined data map which is stored in a computer memory (e.g., ROM), on the basis of the two input informational signal values Ne and Q. In step S2, an actual fuel-injection timing (simply an actual IT) is detected as a crank angle (or a crankshaft angular position) at the timing of initiation of lifting action (or opening action) of the needle valve, on the basis of the crank angle (or the crankshaft angular position which is derived from the pulse signal generated from the pulse pickup type speed sensor 29) and the lift value indicative signal from the needle valve lift sensor 31. In step S3, the difference $\Delta IT$ (=actual IT-target IT) between the actual fuel-injection timing and the target fuel-injection timing is calculated. In step S4, the basic duty cycle value (DTCVP) is updated by a final duty cycle value (DTCV) which is arithmetically calculated through the arithmetic routine shown in FIG. 5 one cycle before and temporarily stored in the predetermined memory address of the computer memory (e.g., RAM). In step S5, a test is made to determine whether the sign of the difference ($\Delta IT$), obtained through step S3, is positive ($\Delta IT > 0$) or negative ($\Delta IT < 0$). When the answer to step S5 is negative, that is, in case of $\Delta IT < 0$, the control unit determines that a fuel-injection timing advance is required, and then step S6 is entered. In step S6, the basic duty cycle value (DTCVP) of the electromagnetic solenoid valve 26 is increased or incremented by a value $PI(\Delta IT)$ in accordance with the following expression.

$$DTCVP = DTCVP + PI(\Delta IT)$$

where $PI(\Delta IT)$, which is indicated as a function of the difference (or deviation) $\Delta IT$, is a variable of a proportional-plus-integral control, and involves both a proportional control action part set in direct proportion to the deviation $\Delta IT$ from the target fuel-injection timing, and a slight integral control action part based on whether the sign of the deviation $\Delta IT$ is positive or negative.

When the answer to step S5 is positive, that is, in case of $\Delta IT > 0$, the control unit determines that a fuel-injection timing retardation is required, and then step S7 is entered. Instep S7, the basic duty cycle value (DTCVP) of the electromagnetic solenoid valve 26 is decreased or decremented by a value $PI(\Delta IT)$ in accordance with the following expression.

$$DTCVP = DTCVP - PI(\Delta IT)$$

where $PI(\Delta IT)$ is a variable of the proportional-plus-integral control, based on the deviation $\Delta IT$.

Alternatively, when the deviation ΔIT is generally equal to zero, that is, in case of ΔIT≈0, the basic duty cycle value (DTCVP) is maintained at its current setting, and then the present routine terminates.

As set forth above, the basic duty cycle value (DTCVP) is determined on the basis of the feedback sensor inputs Ne, Q and Lifts, and then the desirable feedback control is executed by the control unit 28 on the basis of these sensor inputs so that the actual fuel-injection timing (actual IT) is adjusted towards the target fuel-injection timing (target IT). As fully discussed later with reference to the flow charts shown in FIGS. 4 and 5, in the system of the invention, the basic duty cycle value (DTCVP), is arithmetically computed through the routine of FIG. 3 during the previously-noted feedback control based on the feedback sensor inputs Ne, Q and Lifts, while considering all of the duty-cycle lower limit DTCVMIN (see the arithmetic processing shown in FIGS. 4 or 6), the final duty cycle value DTCV (see step S35 of FIG. 5), and the deviation ΔIT from the target fuel-injection timing. The previously-noted feedback control for the fuel-injection timing is often called as a closed-loop injection timing control. On the contrary, the condition that the fuel-injection timing control system is not in the closed-loop mode will be hereinafter referred to as an "open-loop injection timing control mode". Similarly, an idle speed feedback control often abbreviated to "ISC control" will be hereinafter referred to as a "closed-loop ISC control". When the engine is at an idle, that is, under the operating condition of engine idle, the fuel-injection amount is adjusted usually by an electronic governor by means of the closed-loop ISC control, so that the engine speed (Ne) is adjusted toward a desired idle speed. For example, the closed-loop ISC control is generally initiated under a particular condition in which the engine is at an idle and either the vehicle speed is less than a predetermined lower threshold value such as 8 km/h or a neutral switch of an automatic transmission is turned on. Thus, at least the operating condition of engine idle is necessary for initiation of the closed-loop ISC control. The previously-noted desired idle speed for the closed-loop ISC control is generally stored in the computer memory in the form of a pre-programmed data map. For instance, the data map may be pre-programmed to define a specified relationship between engine speed (RPM) and engine temperature (coolant temperature). On the other hand, the condition that the idle speed control system does not yet enter the closed-loop ISC control mode, will be hereinafter referred to as an "open-loop ISC mode".

Figure 4:
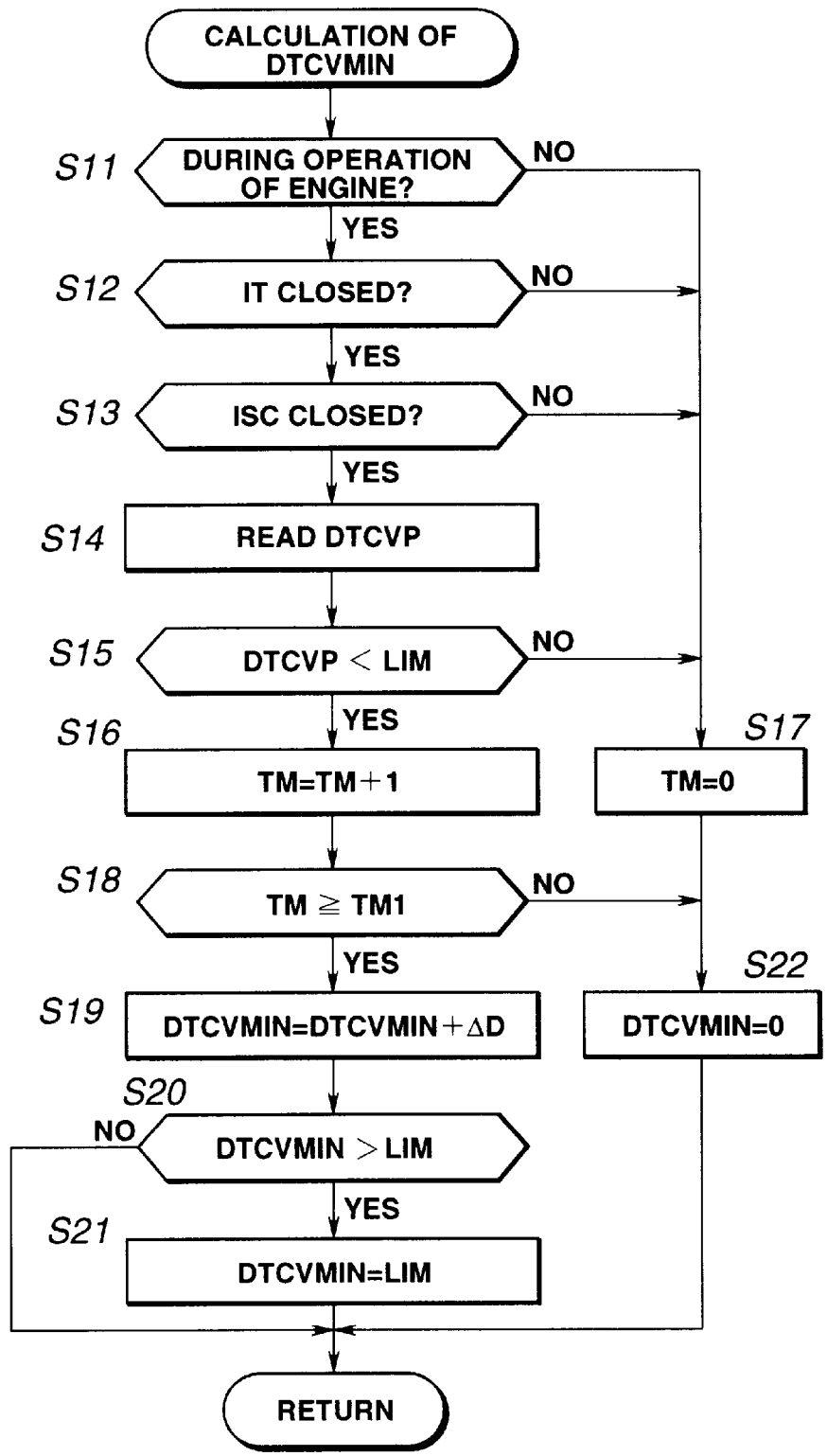
FIG. 4 is a flow chart illustrating an example of a routine for arithmetically calculating a limiting value (particularly a lower duty-cycle limit) necessary for a duty-cycle control being executed by the system of the invention.

Referring now to FIG. 4, there is shown an arithmetic processing for a limiting value denoted by "DTCVMIN" and used for the duty-cycle control for the electromagnetic solenoid valve 26. In the shown embodiment, only a lower duty-cycle limit is actually shown as a limiting value, for the purpose of simplicity of the disclosure. It will be appreciated that it is able to set an upper limiting value (an upper duty-cycle limit) in a similar manner to the routine shown in FIG. 4.

Figure 3:
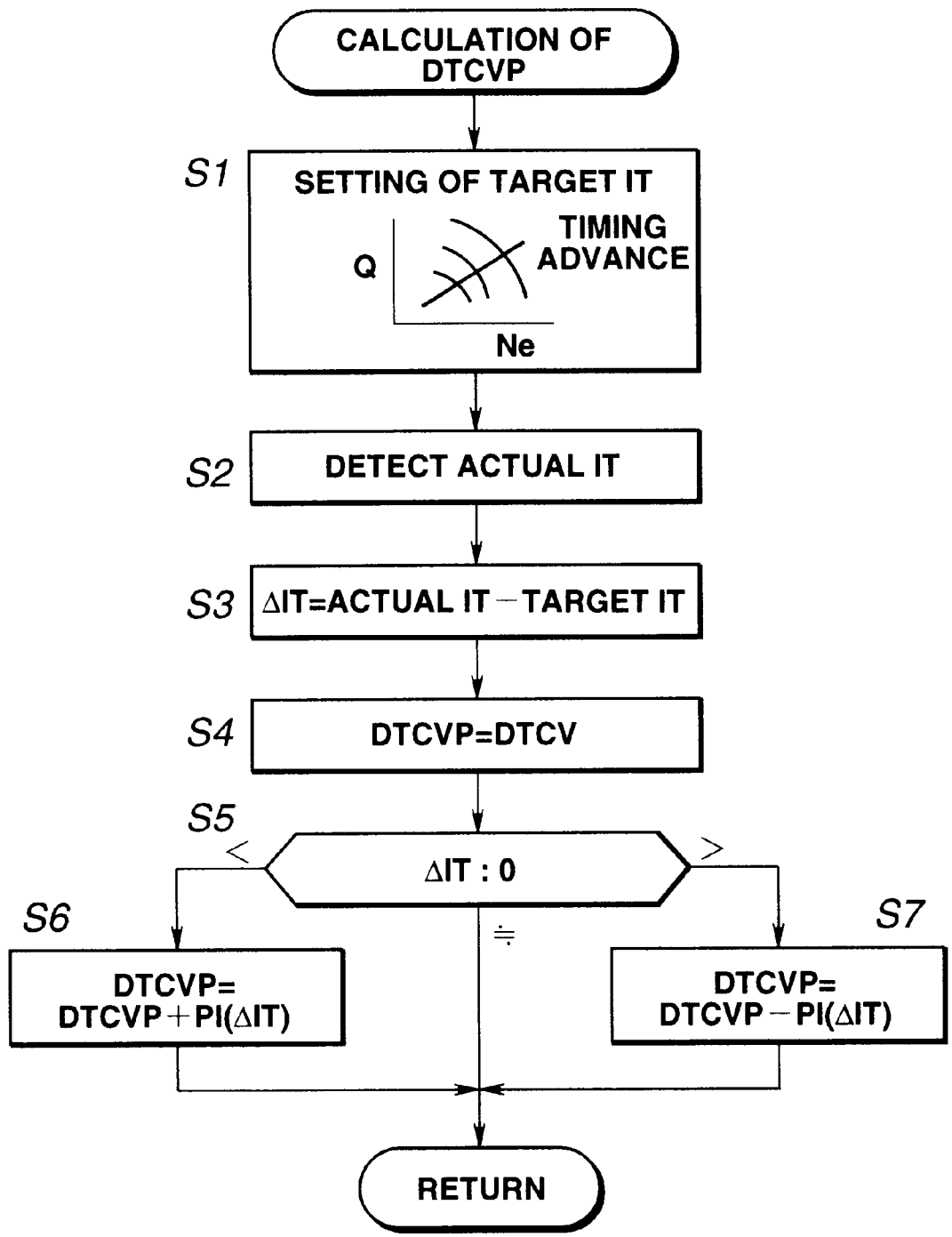
FIG. 3 is a flow chart illustrating a routine for arithmetic calculation for a basic duty cycle value (abbreviated to "DTCVP") of the fuel-injection pump shown in FIG. 2.

In step S11, a test is made to determine whether the engine is running. During operation of the engine, step S12 occurs. In step S12, a test is made to determine whether the injection timing control system is operated either in the closed-loop injection timing control mode or the open-loop injection timing control mode. When the injection timing control system is placed into the closed loop mode, step S13 is entered. In step S13, a test is made to determine whether the idle speed control system is operated either in the closed-loop ISC control mode or the open-loop ISC control mode. When the ISC control system is placed into the closed loop mode, step S14 occurs. In step S14, the basic duty cycle value DTCVP, obtained through the routine of FIG. 3, is read. In contrast to the above, when the engine is not running, or when the injection timing control system is in open loop, or when the ISC control system is in open loop, the procedure flows to stepS17. In step S17, a timer TM is cleared, and thus the count value of the timer TM is reset to "0" (TM=0). Thereafter, step S22 follows. In step S22, the limiting value (the lower duty-cycle limit DTCVMIN) is cleared (DTCVMIN=0), and thus the duty-cycle value limiting process is inhibited. One cycle of the routine shown in FIG. 4 terminates via step S22.

Three necessary conditions, namely during engine operation, during closed-loop injection timing control, and during closed-loop ISC control, are simultaneously satisfied, the procedure advances to step S14. Then, step S15 occurs. In step S15, the basic duty cycle value DTCVP (read at step S14) is compared with a predetermined reference limiting value LIM (a predetermined reference duty cycle value such as 30%), in order to determine whether the basic duty cycle value DTCVP is less than the predetermined reference limiting value LIM. When the basic duty cycle value DTCVP is greater than or equal to the predetermined reference limiting value LIM, i.e., in case of DTCVP≧LIM, the procedure flows from step S15 to step S17 in which the timer TM is cleared, and then to step S22 in which the limiting value DTCVMIN is cleared to zero. On the other hand, when the basic duty cycle value DTCVP is less than the predetermined reference limiting value LIM, that is to say, in case of DTCVP<LIM, the procedure flows from step S15 to step S16. The condition of DTCVP<LIM means entry of the duty cycle of the solenoid valve 26 into a lower dead-zone below the predetermined or preset lower duty-cycle limit LIM. In this manner, when the entry of the duty cycle into the lower dead-zone is detected by the condition of DTCVP<LIM, the timer TM is incremented by "1" (TM=TM+1) through step S16. Then, step S18 occurs. In step S18, the current "count" value of the timer TM is compared with a predetermined value TM1. When the "count" value of the timer TM is less than the predetermined value, that is, in case of TM<TM1, the procedure flows from step S18 to step S22. When the "count" value of the timer TM is above the predetermined value TM1, that is, when a predetermined period of time (TM1) has been elapsed after the entry of the duty cycle into the lower dead-zone, step S19 is entered. In step S19, the lower limiting value DTCVMIN is incremented by a predetermined duty ratio ΔD for example a unit duty ratio of 1% (DTCVMIN=DTCVMIN+ΔD). Then, step S20 occurs in which the lower liming value DTCVMIN, calculated through step S19, is compared with the predetermined reference limiting value LIM such as 30% to determine whether the limiting value DTCVMIN, which is gradually increasing in every cycles of the arithmetic calculations of FIG. 4, reaches the predetermined reference limiting value LIM. When the calculated limiting value DTCVMIN reaches the predetermined reference limiting value LIM and exceeds the latter (DTCVMIN>LIM), step S21 occurs. In step S21, the lower limiting value DTCVMIN is set at the predetermined reference limiting value LIM. When the answer to step S20 is in the negative (NO), that is, in case of DTCVMIN≦LIM, the procedure skips step S21, and thus this routine terminates.

Figure 5:
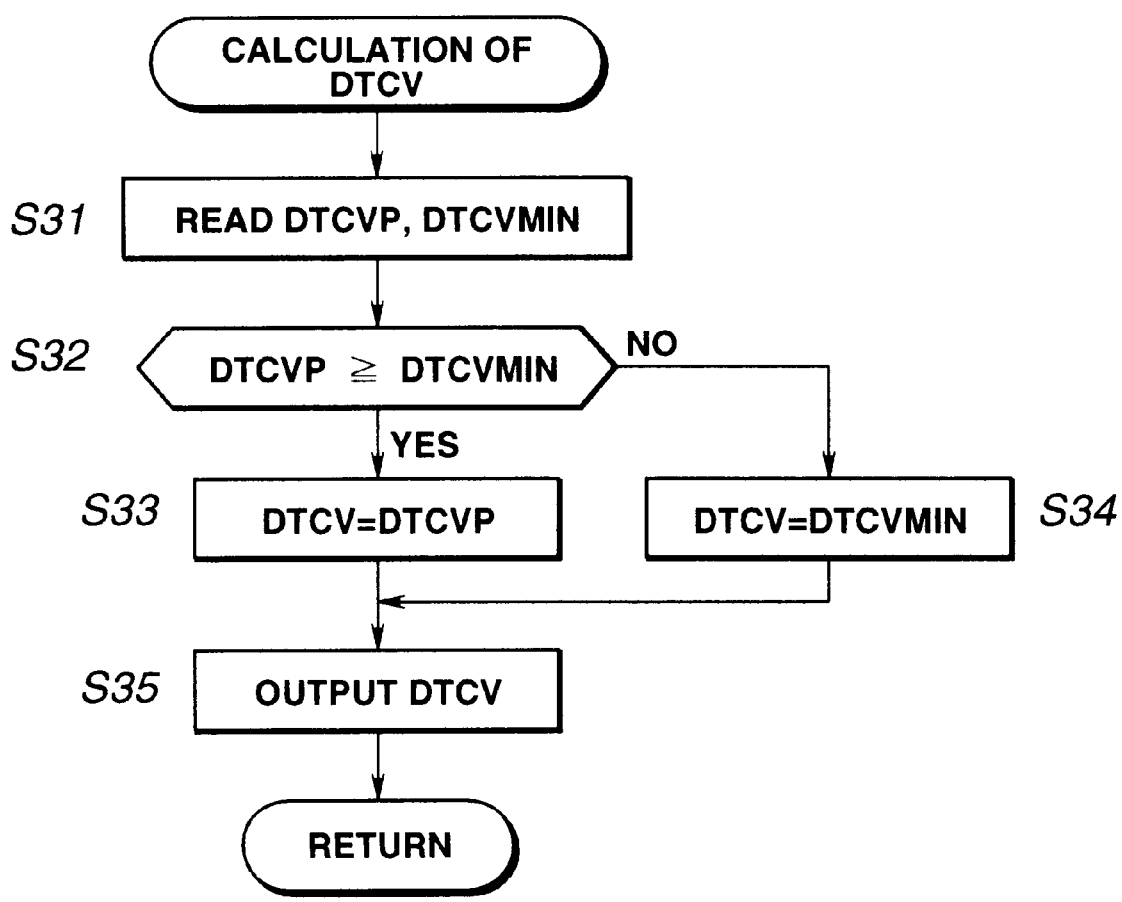
FIG. 5 is a flow chart illustrating a sub-routine for arithmetically calculating a final duty cycle value based on a basic duty cycle value as calculated through the routine of FIG. 3 and a lower limiting value as determined through the routine of FIG. 4.

Referring now to FIG. 5, there is shown the arithmetic calculation routine for the final duty cycle value (DTCV) of the electromagnetic solenoid valve 26.

In step S31, the basic duty cycle value DTCVP, which is obtained either through steps S6 or S7 shown in FIG. 3, and the limiting value DTCVMIN, which is obtained either through steps S21 or S22 shown in FIG. 4, are read. In step S32, the basic duty cycle value DTCVP is compared with the limiting value DTCVMIN to determine whether the basic duty cycle value DTCVP is above the limiting value DTCVMIN. When the basic duty cycle value DTCVP is above the lower limiting value DTCVMIN, that is, in case of DTCVP≧DTCVMIN, step S33 is entered. In step S33, the final duty cycle value DTCV is set at the basic duty cycle value DTCVP (DTCV=DTCVP). In contrast, when the basic duty cycle value DTCVP is less than the lower limiting value DTCVMIN, step S34 occurs. In step S34, the final duty cycle value DTCV is set at the lower limiting value DTCVMIN (DTCV=DTCVMIN). As appreciated from the flow from step S32 to either steps S33 or S34, the final duty cycle value DTCV is set at the higher one of the basic duty cycle value DTCVP and the lower limiting value DTCVMIN, a so-called select-HIGH process. In this manner, the duty-cycle limiting process is executed by the system of the embodiment. Lastly, in step S35, the controlled duty-cycle signal of the final duty cycle value DTCV is output to the solenoid valve 26 which produces a controlled pressure differential necessary for the axial sliding movement of the pressure-differential operated timer piston 8.

Figure 7:
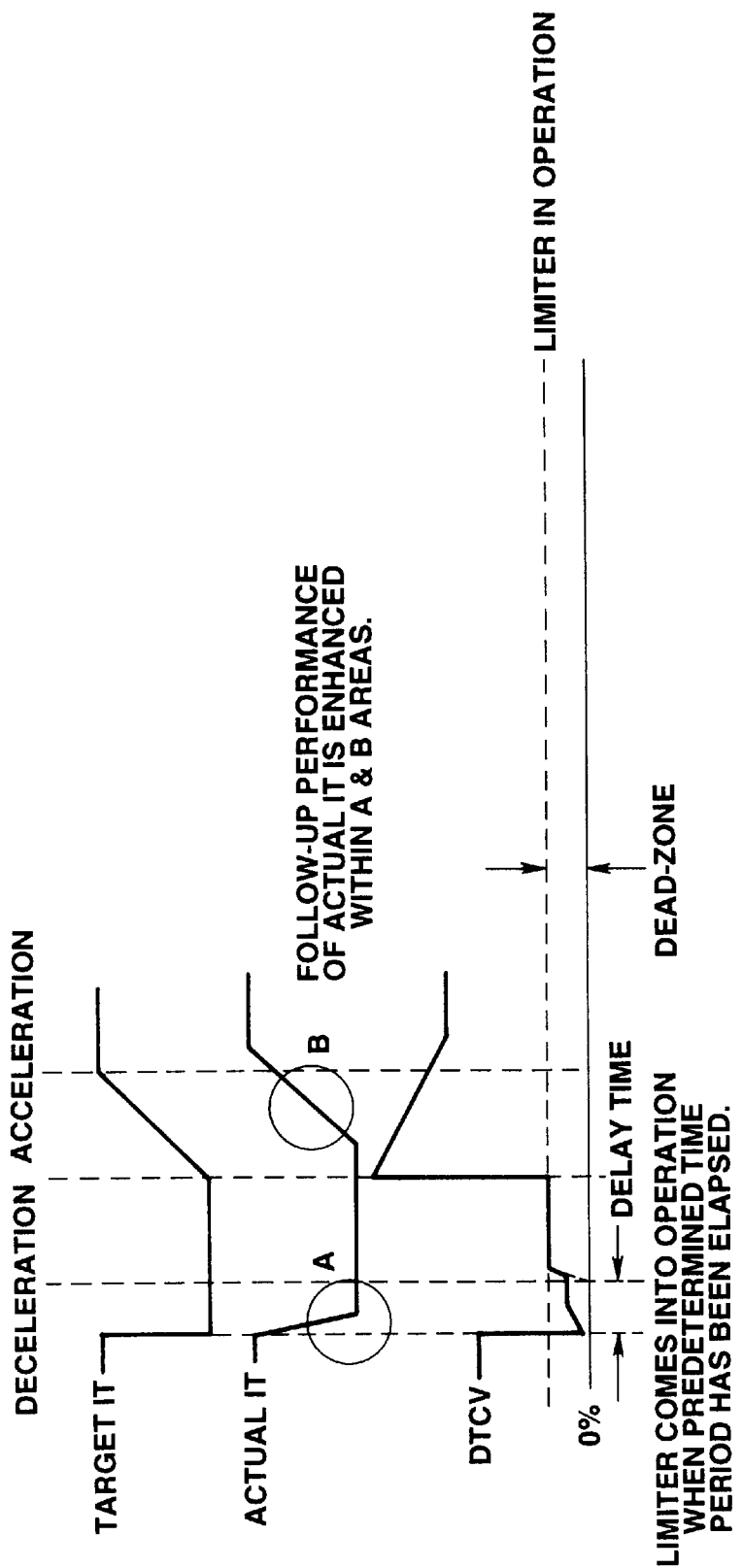
FIG. 7 is a timing chart showing a fuel injection timing control characteristics which is obtained by the system of the invention.

According to the fuel-injection timing control executed by the system of the embodiment, as shown in FIG. 7, when the target injection timing (the target IT) is set at a greatly retarded timing owing to deceleration of the vehicle, the duty-cycle limitation processing is inhibited for a predetermined time period TM1, since the lower limiting value (the duty-cycle lower limit) DTCVMIN is not set at the predetermined reference limiting value LIM such as 30% until the "count" value of the timer TM reaches the predetermined elapsed time TM1 (see the time length defined by the "DELAY TIME" in FIG. 7) under specified conditions, namely during operation cf the engine, during the closed-loop injection timing control, and during the closed-loop idle speed control. As can be appreciated, during the inhibition period of the duty-cycle limitation processing, the system permits entry of the duty cycle value (DTCV) into the dead-zone, thus permitting a rapid drop in the actual injection timing at the beginning of vehicle deceleration. In other words, the system allows a retard action of the actual injection timing to happen so quickly (see the area denoted by A in FIG. 7). Thereafter, as soon as the predetermined time period TM1 has been elapsed, the duty-cycle limitation processing is permitted and initiated. During deceleration, immediately when the duty-cycle limitation processing begins, the lower limiting value (the duty-cycle lower limit) DTCVMIN is set at the predetermined reference limiting value LIM such as 30%, and thus the lower limit of the duty cycle DTCV is limited to the predetermined lower limiting value DTCVMIN (=the reference limiting value LIM) in the latter half of the deceleration period. Actually, the final duty cycle value DTCV of the solenoid valve 26 is set at the higher one of the basic duty cycle value DTCVP calculated through the routine of FIG. 3 and the duty-cycle limiting value DTCVMIN calculated through the routine of FIG. 4 by way of the select-HIGH process. Thereafter, when the engine/vehicle operating condition is shifted from deceleration to acceleration, the fuel-injection timing advance can be quickly achieved with the duty cycle (DTCV) set at the predetermined reference limiting value LIM or more. As discussed above, the duty cycle, which is limited to the predetermined reference limiting value LIM or more through the duty-cycle limitation processing and the select-HIGH process, serves as a stand-by duty cycle in transition from deceleration to acceleration. The system of the invention improves the follow-up performance of timing advance and timing retardation. The fundamental concept of the system of the invention is hereinbelow described in briefly by reference to the block diagram shown in FIG. 1.

Figure 1:
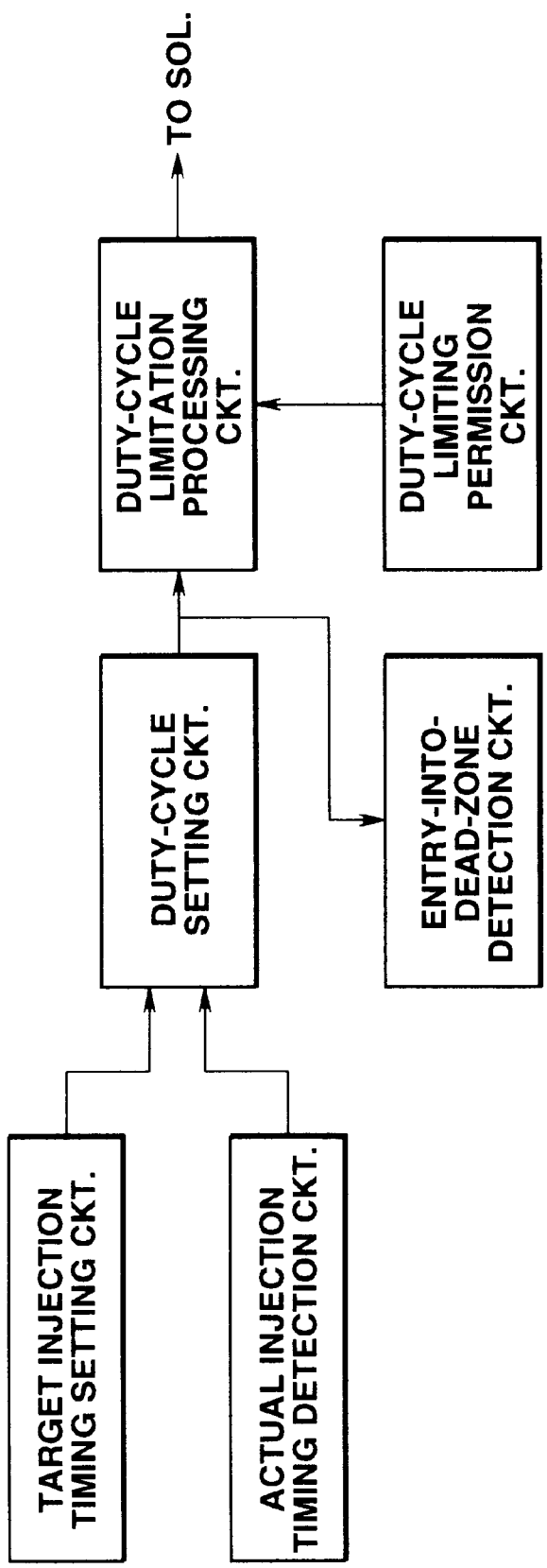
FIG. 1 is a block diagram illustrating one embodiment of a fuel injection timing control system of a duty-cycle controlled fuel-injection pump for diesel engines according to the invention.

As shown in FIG. 1, in a diesel-engine fuel injection timing control system of a fuel-injection pump with a pressure-differential timer piston in which, for a desired fuel-injection timing control, the axial position of the timer piston is controlled or regulated by duty-cycle controlling an electromagnetic solenoid valve disposed in a communication passage intercommunicating a high-pressure chamber defined to face one end of the timer piston and a low-pressure chamber defined to face the other end of the timer piston, the system comprises a target injection timing setting circuit for setting a target injection timing depending on an engine operating condition, an actual injection timing detection circuit for detecting an actual. injection timing of the fuel injector, a duty-cycle setting circuit (or a duty-cycle setting means) for setting a duty cycle (DTCVP) of the electromagnetic solenoid valve by comparing the target injection timing with the actual injection timing, an entry-into-dead-zone detection circuit for detecting the entry of the duty cycle into a predetermined dead-zone (the shown embodiment discusses a specific case that the predetermined dead-band is the lower dead-zone) by comparing the duty cycle value (DTCVP) with a predetermined reference limiting value (LIM), a duty-cycle limiting permission circuit for generating a duty-cycle limitation processing enable signal after a predetermined delay time (corresponding to the predetermined time period TM1) from the time when the entry of the duty cycle into the predetermined dead-zone is detected by the entry-into-dead-zone detection circuit, and a duty-cycle limitation processing circuit being responsive to the duty-cycle limitation processing enable signal from the duty-cycle limiting permission circuit for limiting the duty cycle to a predetermined duty cycle value (the higher one of the predetermined reference limiting value LIM and the current setting of the basic duty cycle value DTCVP) so that the duty cycle comes out of the predetermined dead-zone. Then, the final duty cycle (DTCV) processed by the duty-cycle limitation processing circuit is output to the electromagnetic solenoid valve 26 associated with the pressure-differential operated timer piston 8. The previously-noted target injection timing setting circuit substantially corresponds to step S2 of FIG. 3. The actual injection timing detection circuit substantially corresponds to step S2 of FIG. 3. The duty-cycle setting circuit substantially corresponds to steps S3 through S7 of FIG. 3. The entry-into-dead-zone detection circuit substantially corresponds to step S15 of FIG. 4. The duty-cycle limiting permission circuit substantially corresponds to steps S16 and S18 of FIG. 4. The duty-cycle limitation processing circuit substantially corresponds to steps S19 through S21 of FIGS. 4 and 6, and steps S32 and S34 of FIG. 5.

Figure 6:
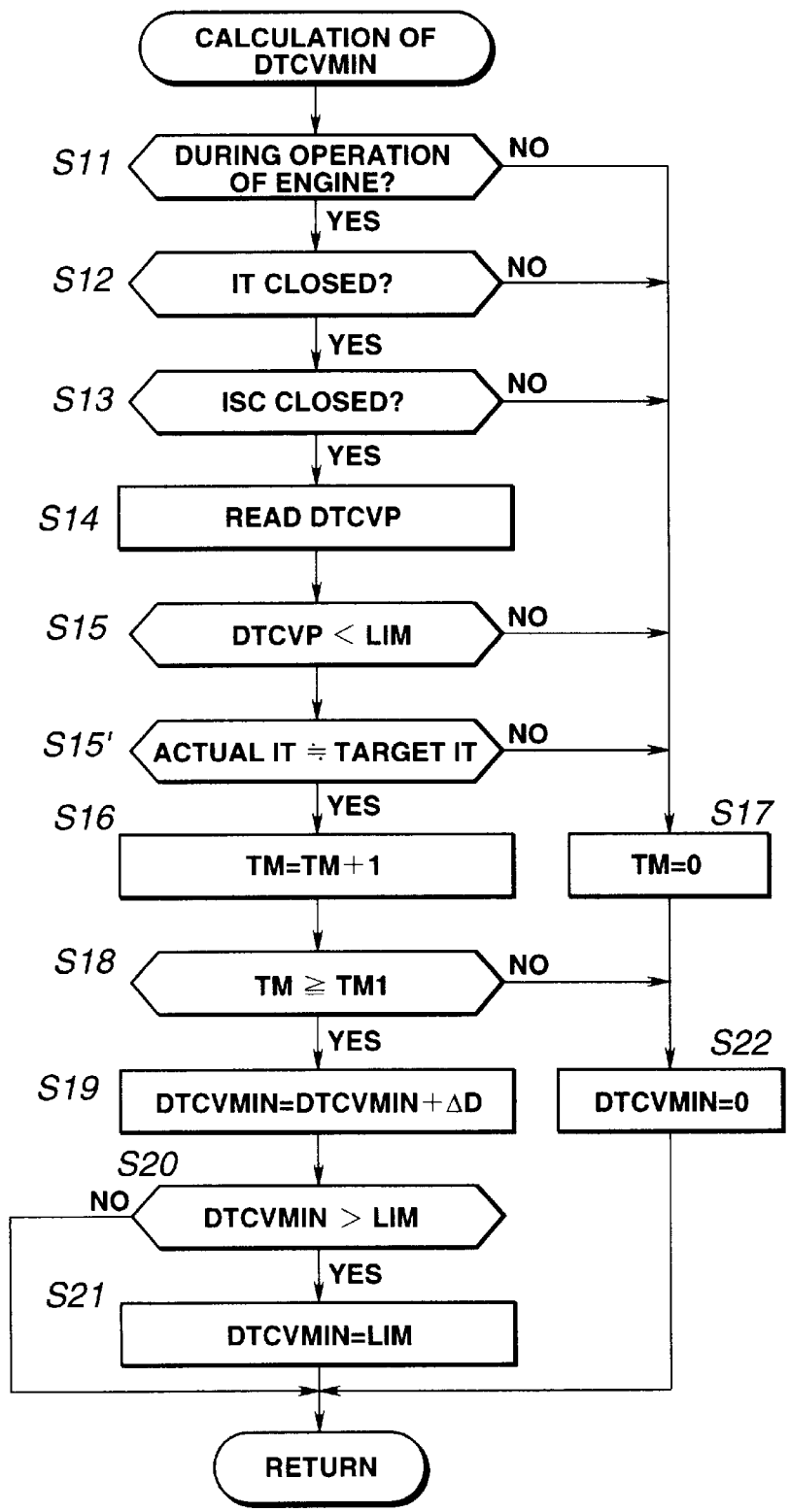
FIG. 6 is a flow chart illustrating another example of a routine for arithmetically calculating a lower limiting value necessary for a duty-cycle control being executed by the system of the invention.

Referring now to FIG. 6, there is shown a modified arithmetic processing executable by the processor (CPU) of the microcomputer employed in the control unit 28, in order to calculate a duty-cycle lower limiting value "DTCVMIN". The modified arithmetic processing shown in FIG. 6 is also executed as time-triggered interrupt routines to be triggered every predetermined time intervals. The modified arithmetic processing of FIG. 6 is similar to the arithmetic processing of FIG. 4, except that step S15' is interleaved between steps S15 and S16. Thus, the same step numbers used to designate steps in the routine shown in FIG. 4 will be applied to the corresponding step numbers used in the modified arithmetic processing shown in FIG. 6, for the purpose of comparison of the two different interrupt routines. Step S15' will be fully described later by reference to the flow of FIG. 6.

When the result of comparison of step S15 of FIG. 6 tells that the basic duty cycle value DTCVP is less than the predetermined reference limiting value LIM such as 30%, i.e., in case of DTCVP<LIM, step S15' occurs. In step S15', a test is made to determine whether the actual injection timing is generally equal to the target injection timing. The answer to step S15' is negative (NO), step S17 is entered to clear the timer TM (TM=0). Then, step S22 occurs in which the limiting value DTCVMIN is cleared (DTCVMIN=0; inhibition of the duty cycle limitation processing). Then, the current routine ends. On the other hand, when the answer to step S15' is positive (YES), that is, in case of actual IT≈target IT, step S16 proceeds in which the "count" value of the timer TM is incremented by "1" (TM=TM+1). As can be appreciated from the above, only when the condition (actual IT≈target IT) of step S15' is further satisfied after the condition (detection of the entry of the duty cycle into the predetermined lower dead-zone defined by the reference limiting value LIM) of step S15 is satisfied, the timer TM begins to count up. In other words, the system never permits the duty-cycle limitation processing until the actual ignition timing becomes generally equal to the target ignition timing during the closed-loop ignition timing control and then the predetermined delay time or the predetermined time period TM1 has been elapsed from the beginning of count-up of the timer TM. As a further simplified arithmetic processing for the limiting value DTCVMIN, in FIG. 6, steps 16 through S18 may be omitted. In this case, as soon as the condition defined in step S15' is satisfied after detection of the entry of the duty cycle into the predetermined lower dead-zone, the system permits the duty-cycle limitation processing.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A fuel injection timing-control system for a diesel fuel injection pump comprising:
    a timer piston (8) mechanically linked to a pump plunger (6) for changing a set position of said pump plunger (6) through an axial movement of said timer piston (8);
    a duty-cycle controlled electromagnetic solenoid valve (26) associated with said timer piston (8) for causing a change in the set position of said pump plunger (6) by varying an axial position of said timer piston in response to a duty cycle (DTCV) of said electromagnetic solenoid valve (26), and for regulating an injection timing of fuel supplied from said diesel fuel injection pump (1) to a diesel fuel injector (16) with the change in the set position of said pump plunger; and
    a control unit (28) for transiently permitting entry of said duty cycle of said electromagnetic solenoid valve (26) into a predetermined dead-zone for a predetermined period of time so that an actual fuel injection timing is adjusted toward a target fuel injection timing based on an engine operating condition, and for limiting said duty cycle to a predetermined limiting value when said predetermined time period has been elapsed, during a fuel injection timing closed-loop control.

2. A fuel injection timing control system for a diesel fuel injection pump (1) with an electromagnetic solenoid valve (26) in which an injection timing of fuel supplied from the diesel fuel injection pump (1) to a diesel fuel injector (16) is controllable by a duty cycle (DTCV) of the electromagnetic solenoid valve (26), said system comprising:
    a target injection timing setting circuit (step S1) for setting a target injection timing based on an engine operating condition;
    an actual injection timing detection circuit (step S2) for detecting an actual injection timing;
    a duty-cycle setting circuit (steps S3, S4, S5, S6, S7) for setting a duty cycle (DTCVP) of the electromagnetic solenoid valve (26) by comparing said target injection timing with said actual injection timing;
    an entry-into-dead-zone detection circuit (step S15) for detecting entry of said duty cycle (DTCVP) into a predetermined dead-zone;
    a duty-cycle limiting permission circuit (steps S16, S17, S18) for generating an enable signal of duty-cycle limitation processing with a predetermined delay time (TM1) from detection of the entry of said duty cycle into said predetermined dead-zone; and
    a duty-cycle limitation processing circuit (steps S19, S20, S21, S32, S34) being responsive to said enable signal from said duty-cycle limiting permission circuit for limiting said duty cycle (DTCV) to a predetermined duty cycle limiting value (LIM) so that said duty cycle comes out of said predetermined dead-zone.

3. The fuel injection timing control system as claimed in claim 2, wherein said duty-cycle limiting permission circuit includes a timer which begins to count an elapsed time from a time when the entry of said duty cycle into said predetermined dead-zone is detected, and said duty-cycle limiting permission circuit outputs said enable signal of duty-cycle limitation processing when a count value of said timer reaches a predetermined period of time (TM1).

4. The fuel injection timing control system as claimed in claim 2, wherein said duty-cycle limiting permission circuit outputs said enable signal when said target injection timing becomes generally equal to said target injection timing after detection of the entry of said duty cycle into said predetermined dead-zone.

5. The fuel injection timing control system as claimed in claim 2, wherein said duty-cycle limiting permission circuit includes a timer which begins to count an elapsed time from a time when said target injection timing becomes generally equal to said target injection timing after detection of the entry of said duty cycle into said predetermined dead-zone, and said duty-cycle limiting permission circuit outputs said enable signal of duty-cycle limitation processing when a count value of said timer reaches a predetermined period of time.

6. The fuel injection timing control system as claimed in claim 2, wherein said duty-cycle limitation processing circuit determines a limiting value so that said limiting value reaches said predetermined duty cycle limiting value (LIM) at a predetermined time rate of change ($\Delta D$).

7. The fuel injection timing control system as claimed in claim 2 wherein, said entry-into-dead-zone detection circuit, said duty-cycle limiting permission circuit and said duty-cycle limitation processing circuit are brought into operation at least under an operating condition of engine idle.

8. A fuel injection timing control system for a diesel fuel injection pump (1), comprising:
    a pressure-differential operated timer piston (8), each piston end cooperating with a pump casing to define a high-pressure chamber (21) and a low-pressure chamber (23), said timer piston (8) mechanically linked to a pump plunger (6) for changing a set position of said pump plunger (6) through an axial movement of said timer piston (8) based on a pressure differential between said high-pressure and low-pressure chambers;

a duty-cycle controlled electromagnetic solenoid valve (26) fluidly disposed in a communication passage (25-1, 25-2) intercommunicating said high-pressure and low-pressure chambers (21, 23) for causing a change in the set position of said pump plunger (6) by varying the pressure differential in response to a duty cycle (DTCV) of said electromagnetic solenoid valve (26), and for regulating an injection timing of fuel supplied from the diesel fuel injection pump (1) to a diesel fuel injector (16) with the change in the set position of said pump plunger (6);

a target injection timing setting circuit (step S1) for setting a target injection timing based on an engine operating condition;

an actual injection timing detection circuit (step S2) for detecting an actual injection timing;

a duty-cycle setting circuit (steps S3, S4, S5, S6, S7) for setting a duty cycle (DTCVP) of said electromagnetic solenoid valve (26) by comparing said target injection timing with said actual injection timing;

an entry-into-dead-zone detection circuit (step S15) for detecting entry of said duty cycle (DTCVP) into a predetermined lower dead-zone;

a duty-cycle limiting permission circuit (steps S16, S17, S18) for generating an enable signal of duty-cycle limitation processing with a predetermined delay time (TM1) from detection of the entry of said duty cycle into said predetermined lower dead-zone; and a duty-cycle limitation processing circuit (steps S19, S20, S21, S32, S34) being responsive to said enable signal from said duty-cycle limiting permission circuit for limiting said duty cycle (DTCV) to a predetermined duty cycle lower limiting value (LIM) so that said duty cycle comes out of said predetermined lower dead-zone.

9. The fuel injection timing control system as claimed in claim 8, wherein said duty-cycle limiting permission circuit includes a timer which begins to count an elapsed time from a time when the entry of said duty cycle into said predetermined lower dead-zone is detected, and said duty-cycle limiting permission circuit outputs said enable signal of duty-cycle limitation processing when a count value of said timer reaches a predetermined period of time (TM1).

10. The fuel injection timing control system as claimed in claim 8, wherein said duty-cycle limiting permission circuit outputs said enable signal when said target injection timing becomes generally equal to said target injection timing after detection of the entry of said duty cycle into said predetermined lower dead-zone.

11. The fuel injection timing control system as claimed in claim 8, wherein said duty-cycle limiting permission circuit includes a timer which begins to count an elapsed time from a time when said target injection timing becomes generally equal to said target injection timing after detection of the entry of said duty cycle into said predetermined lower dead-zone, and said duty-cycle limiting permission circuit outputs said enable signal of duty-cycle limitation processing when a count value of said timer reaches a predetermined period of time.

12. The fuel injection timing control system as claimed in claim 8, wherein said duty-cycle limitation processing circuit determines a limiting value so that said limiting value increases up to said predetermined duty cycle lower limiting value (LIM) at a predetermined time rate of change (ΔD).

13. The fuel injection timing control system as claimed in claim 8, said entry-into-dead-zone detection circuit, said duty-cycle limiting permission circuit and said duty-cycle limitation processing circuit are brought into operation at least under an operating condition of engine idle.

14. The fuel injection timing control system as claimed in claim 8, said entry-into-dead-zone detection circuit, said duty-cycle limiting permission circuit and said duty-cycle limitation processing circuit are brought into operation when the fuel injection timing control system is in a closed-loop mode during engine idling.

* * * * *